(12) United States Patent
Azevedo et al.

(10) Patent No.: US 7,383,807 B2
(45) Date of Patent: Jun. 10, 2008

(54) COATED POWER CYLINDER COMPONENTS FOR DIESEL ENGINES

(75) Inventors: Miguel Azevedo, Ann Arbor, MI (US); Geoffrey N. Ainsworth, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 81 days.

(21) Appl. No.: 11/439,353

(22) Filed: May 22, 2006

(65) Prior Publication Data

US 2007/0000468 A1   Jan. 4, 2007

Related U.S. Application Data

(60) Provisional application No. 60/683,575, filed on May 23, 2005.

(51) Int. Cl.
*F02F 3/00* (2006.01)
(52) U.S. Cl. .................................................. 123/193.6
(58) Field of Classification Search ............. 123/193.6; 92/223; 29/888.048
See application file for complete search history.

(56) References Cited

U.S. PATENT DOCUMENTS

| | | | | |
|---|---|---|---|---|
| 1,975,818 A | * | 10/1934 | Work | .......................... 205/149 |
| 4,148,284 A | * | 4/1979 | Prosen | ....................... 123/78 C |
| 4,334,507 A | * | 6/1982 | Kohnert et al. | ........... 123/193.6 |
| 4,838,149 A | | 6/1989 | Donnison et al. | |
| 4,846,940 A | | 7/1989 | Neuhauser et al. | |
| 4,859,493 A | | 8/1989 | Lemelson | |
| 4,941,397 A | * | 7/1990 | Kawai et al. | ................... 92/223 |
| 4,974,498 A | | 12/1990 | Lemelson | |
| 5,040,501 A | | 8/1991 | Lemelson | |
| 5,063,894 A | * | 11/1991 | Mielke et al. | ............ 123/193.6 |
| 5,067,826 A | | 11/1991 | Lemelson | |
| 5,158,052 A | * | 10/1992 | Yoshimura | ................ 123/193.6 |
| 5,257,603 A | * | 11/1993 | Bauer et al. | .............. 123/193.6 |
| 5,284,394 A | | 2/1994 | Lemelson | |
| 5,433,001 A | * | 7/1995 | Tsuchiya et al. | ........ 29/888.074 |

(Continued)

FOREIGN PATENT DOCUMENTS

DE    19848590    4/2000

(Continued)

OTHER PUBLICATIONS

Vladimir Kompan, The Diamond Enhanced Composite Coating, Jan. 10, 2005, Diamond Composite Technology, a division of UK Abrasives, Inc.

*Primary Examiner*—M. McMahon
(74) *Attorney, Agent, or Firm*—Robert L. Stearns; Dickinson Wright PLLC

(57) ABSTRACT

A diesel engine piston assembly comprises a piston body having a top wall with a combustion bowl formed in the top wall and having a combustion bowl edge, an outer ring belt formed with a plurality of ring grooves including a top ring groove with an upper wall of the top ring groove and a top land portion of the ring belt disposed between the top ring groove and the top wall, a pair of pin bosses with aligned pin bores and a skirt; and a diamond dispersed chromium composite coating applied to at least the top wall, the combustion bowl edge, the top land portion and the upper wall of the top ring groove.

23 Claims, 3 Drawing Sheets

U.S. PATENT DOCUMENTS

| | | | |
|---|---|---|---|
| 5,449,547 A | * | 9/1995 | Miyazaki et al. ............ 428/217 |
| 5,458,927 A | | 10/1995 | Malaczynski et al. |
| 5,616,372 A | | 4/1997 | Conley et al. |
| 5,836,280 A | * | 11/1998 | Miyazawa ............... 123/193.4 |
| 6,139,022 A | | 10/2000 | Iwashita et al. |
| 6,213,474 B1 | * | 4/2001 | Sameshima et al. ......... 277/434 |
| 6,244,161 B1 | | 6/2001 | Myers et al. |
| 6,503,642 B1 | | 1/2003 | Linde |
| 6,546,922 B1 | * | 4/2003 | Bischofberger ............. 123/668 |
| 6,553,957 B1 | | 4/2003 | Ishikawa et al. |
| 6,588,408 B2 | | 7/2003 | Bedwell et al. |
| 6,877,473 B2 | * | 4/2005 | Bischofberger et al. . 123/193.6 |
| 2004/0011433 A1 | | 1/2004 | Shiozaki et al. |
| 2005/0014010 A1 | | 1/2005 | Dumm et al. |
| 2006/0220322 A1 | | 10/2006 | McCormick et al. |

FOREIGN PATENT DOCUMENTS

| | | |
|---|---|---|
| JP | 4333599 | 11/1992 |

* cited by examiner

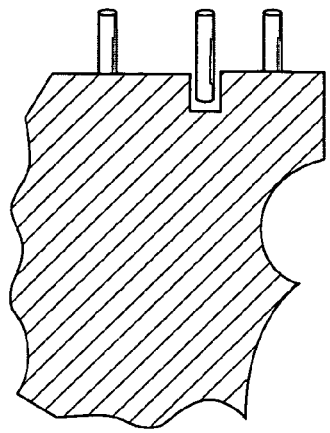
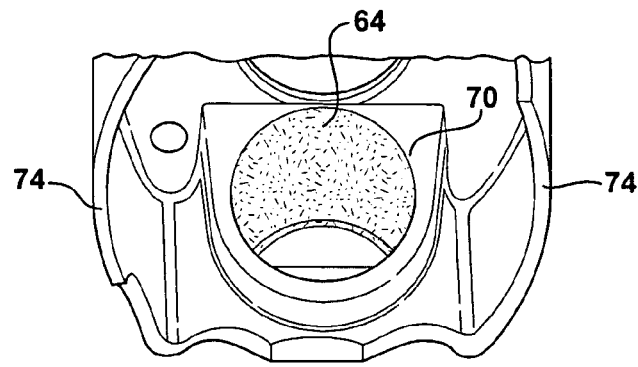
FIG - 7  FIG - 8
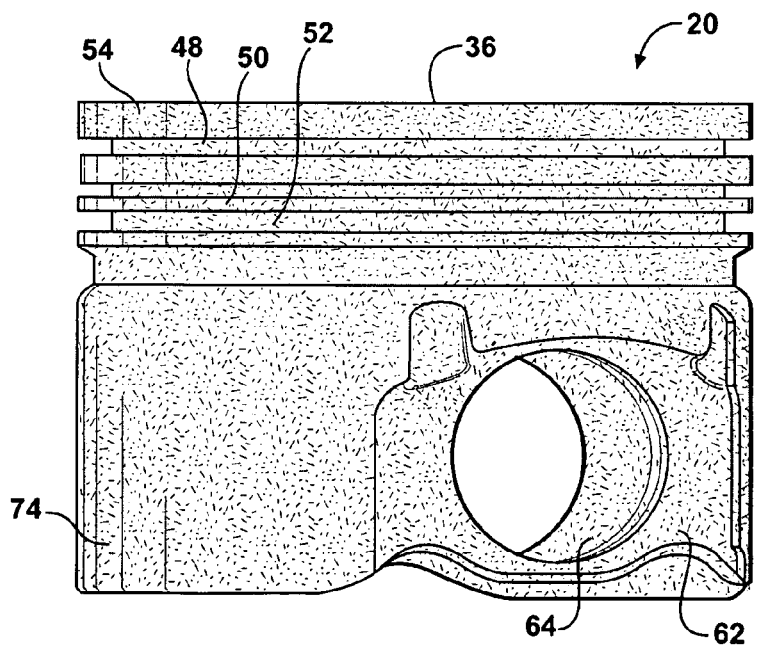
FIG - 9

COATED POWER CYLINDER COMPONENTS FOR DIESEL ENGINES

This application claims priority to and incorporates by reference U.S. Provisional Application 60/683,575 filed May 23, 2005.

BACKGROUND OF THE INVENTION

1. Technical Field

This invention relates generally to diesel engines and more particularly to coatings used to protect the various power cylinder components of the power cylinder including the piston.

2. Related Art

Many ways and means exist to protect in-cylinder diesel engine components from deleterious effects of combustion by-products, notably when EGR (exhaust gas recirculation) is used in the engine. Also, it has been proposed to use coatings as joint tribological elements in lieu of bushings and bearings and the like. As examples of the latter, manganese phosphate, DLC (diamond-like-coatings), many variations of PVD (physical vapor deposition)-derived coatings, electroless and electroplated layers.

With widespread use of high pressure diesel engine injection systems (common rail, electronic unit injectors, hydraulic electronic unit injectors) piston bowl rim oxidation/erosion by the torch-like effects from each combusting fuel plume are becoming commonplace. Also, due to late fuel injection timing necessary to preclude NOx formation, instances of liner fuel overspray have been documented. On the other extreme, early or pilot injection might deposit liquid fuel on piston tops that remains unburnt for most of the compression stroke. There are several side effects to these conditions inherent with high pressure diesel injections systems, including: 1) the build-up of carbon deposits on the top land of diesel engine pistons, 2) the deterioration of the oil film at top dead center/top ring reversal point on the liner and 3) piston erosion (pitting) particularly where the plumes from the injectors fire on the top bowl edge of the piston.

Top land carbon build up is historically singled out as the root cause of bore polishing and subsequent lubricant oil control loss. Emissions are then adversely affected.

Liner overspray with fuel dilutes and contaminates the oil film, greatly affecting the ability of the squeeze film to handle the first ring contact load. Fuel overspray also depletes the lubricant TBN reserve and entrains soot into the oil film. The net effect is the formation of a corrosive/abrasive medium which wears out components in intimate contact with the medium. Chemical etching (corrosion) of the liner on the first 20 to 40 mm of the piston travel from TDC not only leads to accelerated local wear, but also leads to higher ring peripheral (OD) face wear.

Local uncontrolled (explosive) deposited fuel burn creates extremely high thermal and mechanical stressing of the piston material. Eventually pitting occurs and will structurally weaken reentrant combustion bowl overhang lip and breakage can occur. Further out towards the piston OD, craters can be dug into the metal substrate. Emissions and overall engine performance are adversely affected. These factors may combine in such a way as to aggravate first ring groove wear in high pressure/high thermal loaded diesel engines.

What has been described thus far are typical problems, to a greater or lesser degree, derived from in-cylinder environment created by emissionized engines having EGR. In addition, the high rate of pressure rise and high peak combustion pressure characteristic of modern diesel engines slap the piston against and excite the liner's vibratory motions, triggering liner cavitation which can be a major problem itself. Skirt coatings (polymer based or graphite impregnated) are expected to help diminish cavitation but they bring additional problems of their own, besides being cumbersome to apply during manufacture.

SUMMARY OF THE INVENTION

The inventor has found that an electroplate coating typically used in the stamping industry, and sometimes used in the auto racing field to coat the skirts of gasoline engine pistons which do not suffer from the problems described above in connection with high pressure diesel engines with EGR, is highly effective in overcoming or greatly minimizing the deleterious effects that the diesel engine environment has on steel pistons as described above. "DIA-CLUST" is a trademark of a product used by some electroplating job shops in the United States. The process was developed to increase the life of intricate stamping dies. It consists of electroplating in-place a mixed layer of chromium and industrial diamonds. The diamond clusters are extremely small (less than 40 nm) in size. The electroplated layer exhibits a very smooth surface and a very low coefficient of friction (about 0.08). The coating for diesel engine applications is on the order of about 2 to 10 μm.

The chromium in the layer imparts corrosion and oxidation resistance to the power cylinder components coated with the composite chromium/diamond coating and is responsible for reduced groove wear/pin bore triboligical behavior and top land carbon build up avoidance. The combined effects of the Cr and diamond clusters also impart resistance to scuffing of the skirt portions of the piston and cavitation of the liner, thus enabling pistons to run at much tighter running clearances, when applied to piston skirts without concern for localized welding or seizing of the piston within the liner. Mitigating liner cavitation is tantamount to reducing assembly clearances afforded by the lubricious nature of the coating.

A diesel engine piston assembly according to one aspect of the invention includes a piston body having a top wall with a combustion bowl formed in the top wall and having a combustion bowl edge, an outer ring belt formed with a plurality of ring grooves including a top ring groove with an upper wall of said top ring groove and a top land portion of the ring belt disposed between the top ring groove and the top wall, a pair of pin bosses with aligned pin bores and a skirt. A diamond dispersed chromium composite coating is applied to at least the top wall, the combustion bowl edge, the top land portion and the upper wall of the top ring groove.

According to a further aspect of the invention, a power cylinder assembly includes a piston having a top surface, at least one ring groove with groove wall surfaces and at least one pin bore with a pin bore surface; at least one piston ring with an outer diameter surface, an inner diameter surface and top and bottom surfaces; a connecting rod having one end with a small bore opening and an opposite end with a large bore opening; a wrist pin having an outer surface; a cylinder liner having an inner cylinder wall; and a diamond dispersed chromium composite coating applied to at least a portion of the top surface of the piston, one of either a top wall surface of the at least one ring groove and the top surface of the piston ring, one of either the outer diameter surface of the piston ring and the inner cylinder wall of the cylinder liner, one of either of the outer surface of the wrist pin or the surfaces of the pin bore of the piston and the small bore opening of the connecting rod.

BRIEF DESCRIPTION OF THE DRAWINGS

These and other features and advantages of the present invention will become more readily appreciated when considered in connection with the following detailed description and appended drawings, wherein:

FIG. 7 is a diagrammatic view of a portion of the piston shown during plating;

FIG. 8 is a fragmentary perspective view showing a pin boss portion of the piston of FIG. 1;

FIG. 9 is a perspective elevation view of the piston;

DETAILED DESCRIPTION

Figure 1:
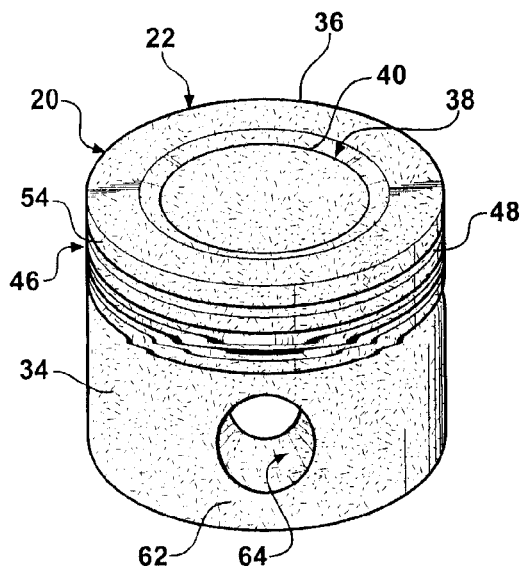
FIG. 1 is a schematic perspective view of a piston.
Figure 2:
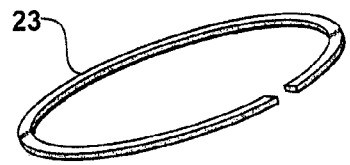
FIG. 2 is a schematic perspective view of a piston ring.
Figure 3:
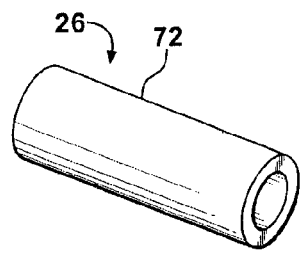
FIG. 3 is a schematic perspective view of a wrist pin.
Figure 4:
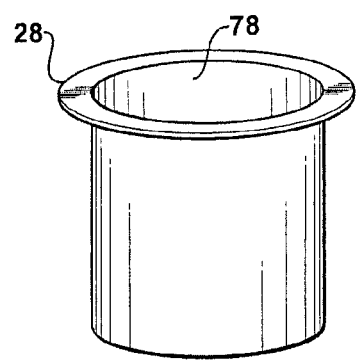
FIG. 4 is a schematic perspective view of a cylinder liner.
Figure 5:
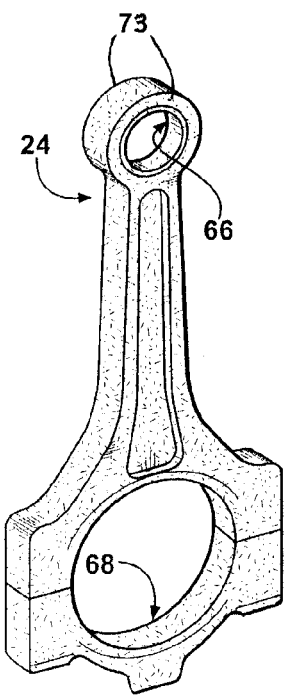
FIG. 5 is a schematic perspective view of a connecting rod.

FIGS. 1 and 8-10 illustrate a piston 20 of a piston assembly 22 which includes the piston 20, one or more piston rings 23, a connecting rod 24 and a wrist pin 26. The piston assembly 22 is part of a power cylinder assembly 27 which additionally includes a cylinder liner 28, a crankshaft 30 and an engine block 32. Those skilled in the art of diesel engines will understand how these components connect to one another and operate and thus a detailed description is not necessary, with the schematic views being sufficient for an understanding of the working of the components in the context of the invention.

The piston 20 includes a piston body 34. For many diesel applications, a piston fabricated of steel is preferable, although other materials are contemplated such as iron and aluminum.

The piston body 34 has a top surface 36 in which a combustion bowl 38 is recessed. The bowl 38 may be shaped to include a bowl rim or lip 40 which, as illustrated, may project radially inwardly to define an undercut region 42 of the bowl 38 beneath the lip 40. The bowl may further be designed, as illustrated, with a cut back region 44 above the lip 40.

The piston body 34 may further include an outer ring belt wall 46 that projects down from the top surface 36 and which is formed with a plurality of ring grooves 48, 50, 52. The upper-most or top ring groove is designated by the reference numeral 48. A top land region 54 is defined between the top ring groove 48 and the top surface 36 of the piston.

Figure 10:
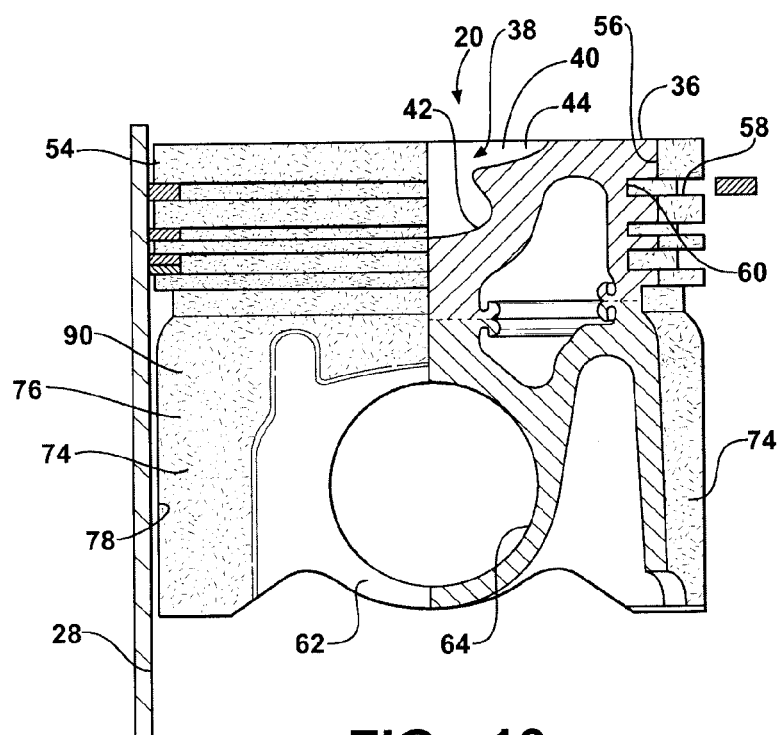
FIG. 10 is a split cross-sectional elevation view of the piston.

The top ring groove 48 includes an upper top wall 56, a lower or bottom wall 58 and a back wall 60, as best seen in FIGS. 9 and 10. An associated one of the rings 23 is received in the top ring groove 48 in known manner. Others of the rings 23 are similarly received in the grooves 50, 52 in known manner. The lowest of the ring grooves 52 may receive a set of oil rings which for the sake of simplicity is given the same designation 23, but understood to be of typically different construction that of compression rings received in the grooves 48, 50.

The piston body 34 is formed with at least one and, as illustrated, a pair of pin bosses 62 formed with a pair of aligned pin bores 64. The connecting rod 24 is formed with a small bore 66 at one end and a large bore 68 at the opposite end. The small end of the connecting rod 24 is inserted in a lateral space provided between inner facing surfaces 70 of the pin bosses (only one of the surfaces 70 shown in FIG. 8) and the wrist pin 26 is extending through the aligned pin bores 64 and small bore 66 to couple the piston 20 to the connecting rod 24 in jointed manner. The wrist pin 26 has an outer surface 70 that interacts with the pin bores 64 of the piston 20 and the small bore 66 of the connecting rod 24.

The piston body 34 further includes a piston skirt 74 having outer cylinder engaging surfaces 76 on either side of the pin bosses 62. The skirt 74 may be formed as one piece with the pin bosses 62 as illustrated and thus may be of the same material. The piston assembly is installed in the piston cylinder 28, with the piston rings 23 engaging an inner wall 78 of the cylinder. The outer surface 76 of the skirt 74 is also in close proximity to the wall 78 and can operate to engage the wall during the reciprocation of the piston 20 within the cylinder 28 to keep the piston 20 in line.

Figure 6:
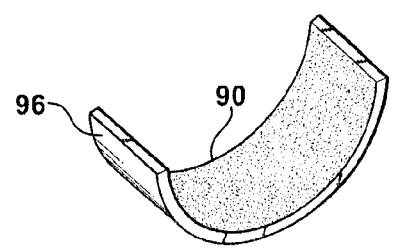
FIG. 6 is a schematic perspective view of a plain engine bearing.

The large end of the connecting rod 24 may be coupled to the crankshaft 30 by means of an associated crank arm surface or journal 80 that is received in the large bore 68 and serves to couple the connecting rod 24 to the crankshaft 30 through a jointed connection between the crank arm 80 and the large bore 68. The crankshaft 30, in turn, is supported for rotation through supported of journals 82 of the crankshaft 30 in associated crank arm support blocks or surfaces 84 of the engine block 32. Typically, main bearings (FIG. 6) of an engine line the surface 84 and serve to journal the crankshaft 30.

Figure 11:
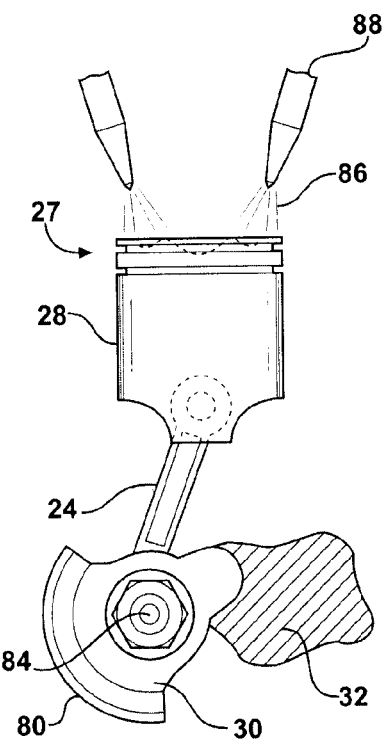
FIG. 11 is a schematic illustration of a power cylinder assembly.

During operation of a diesel engine, the top surface 36 and combustion bowl 38 (particularly the lip 40) are directly subjected to the heat and pressure of combustion. Fuel plumes 86 emitting from the fuel injectors (FIG. 11) direct fuel onto these surfaces and the constant spray combined with the heat, pressure and corrosive EGR environment has the effect of eroding a typical piston. Over time, the exposed regions can be caused to pit and wear away leading to the eventual need for replacement of the piston 20. The inventor has found that by applying a skin of diamond dispersed chromium composite coating 90 over the areas that would otherwise be affected, that the piston remarkably was able to withstand prolonged exposure to harsh EGR testing environments and sustain little if any visible signs of wear or damage of any significance, including in those areas directly exposed to the plume 86 of fuel emitting from the injectors 88. Even more surprising is the discovery that an apparent conversion of the material takes place when subjected the harsh EGR diesel environment which appear to have the effect of actually strengthening the coating and making it more effective over time. The details of the conversion mechanism and the resultant changes are not well understood by the inventor at this time, but it does appear to occur. Thus, at least a portion of the top surface 36 is covered with the coating 90. The piston may have its entire top surface 36 coated, including all or part of the recessed bowl 38 and particularly the lip 40.

The Dia-Clust coating is believed to be proprietary. Reference is made to the website materials of Diamond Composite Technology, a division of U.K. Abrasives, Inc. entitled *The Diamond Enhanced Composite Coating*, the disclosure of which is incorporated herein by reference.

The top land 54 is also coated with a layer of the material 90. The top land is typically subject to carbon build-up in an EGR diesel environment as explained in the background art section. What was surprisingly found was that application of the coating to the areas prone to carbon build-up resulted in a piston that had little or no build-up.

The skirt 74 also benefits from the coating 90. The coating minimizes scuffing of the inner cylinder wall 78 by the skirt 74 and also permits closer tolerance of the skirt to the cylinder. The inner wall 78 could alternatively be provided with the coating 90.

The inner surfaces 70 of the pin bosses 62 can likewise be coated in conjunction with uncoated side surfaces 73 of the small bore end 66 of the connecting rod 24. The opposite arrangement could also be employed, with the connecting rod sides coated and the piston surfaces 70 uncoated.

The carbon build-up on the top land 54 typical of many pistons also can lead to an accumulation of the material in the ring grooves, and particularly the top ring groove 48. This can lead to ring sticking and/or breakage. What was further surprisingly found was that by coating at least the top wall 56 of the top groove 54 had the effect of greatly reducing or all together eliminating the condition of build-up in the top groove 48. Alternatively, the top surface of the piston ring 23 could be coated with the coating 90. If the groove 48 is coated, all of the surfaces 56, 58 and 60 may be coated. In such case, the surfaces of the ring (top, bottom inner) would not be coated. The radially outer surface 92 of the ring 23 may be coated regardless of whether the ring or groove walls are coated, in which case the regions of the inner cylinder wall 78 against which the coated ring 23 would run would not be coated with the coating 90. In cases where the coating 90 is applied to one component that will be in operational contact with another component (e.g., ring and groove walls) it is preferred that only one of the surfaces be coated. Otherwise, the coated surfaced would wear on one other. The uncoated surface in such case is preferably designed with a hardness less than that of the coated surface. The uncoated surface may have a hardness of about 20Rc less than that of the coated surface and perform well.

The piston joint made up of the pin bosses 62, the connecting rod 24 and the wrist pin 26 may also be provided with the coating material 90. The invention contemplates that the pin bores 64 and the small bore 66 could be coated with the coating 90, whereas the wrist pin 26 would be uncoated. The invention further contemplates the opposite arrangement, wherein the outer surface 72 of the wrist pin 26 is coated with the coating 90 and the bores 64, 66 are uncoated. The same coated/uncoated matching of surfaces applies to the piston joint. If insert plan bearings 94 are desired, they may be of the type illustrated in FIG. 6 in which a steel backing 96 is coated with the coating material 90 which would be installed in the pin bores 64, and a similar bushing in the small bore 66, in combination with an uncoated wrist pin 26.

The joint at the large end of the connecting rod 24 can be similarly designed as that of the piston joint. Either the large bore 68 or crank supports 84 can be coated with the coating 90 and the crank arm 80 uncoated, or vise versa. The bearings 94 of FIG. 6 could also be employed in the general manner described above with respect to the piston joint.

Thus, surprising and unexpected results have been realized in connection with the usage of the coating material 90 in diesel engine power cylinder components. In a diesel engine run with EGR under a load factor of 1.11/220 bar peak pressure for about 1000 hours, it was surprisingly found that there was essentially no carbon build-up on the top land 54, there was essentially no significant oxidation or erosion of the bowl rim in the vicinity of the fuel plumes acting on the bowl rim, there was essentially no EGR-induced corrosion detected, there was essentially no detectible first ring groove wear in the cylinder wall, there was essentially no pin bore wear or wrist pin wear and no skirt scuffing or liner cavitation. The overall condition of the piston following testing was essentially unchanged. A further surprising development was that the coating appeared to go through a thermal-induced conversion at the top of the piston exposed to the heat of combustion, particularly in the vicinity of the fuel plume. Rather than wear away, the coating appears to have converted into a more durable phase that of the original coating microstructure, which is believed in part to contribute to the toughness and durability of the coating under such harsh conditions.

FIG. 7 illustrates a conformable anode 98 arrangement whereby the coating 90 can be applied by electrodeposition in a plating bath. The piston can be supported for rotation about its longitudinal axis with the outer surfaces to be coated in spaced relation to the conformable anode 98. The piston is preferably rotationally symmetrical in areas where the coating is desired and can be used to control thickness of the coating 90 in the area of the ring grooves and the combustion bowl.

Obviously, many variations of the present invention are possible in light of the above teachings, therefore, to be understood that within the scope of the appended claims, the invention may be practiced otherwise than as specifically described.

What is claimed is:

1. A diesel engine piston assembly comprising:
a piston body having a top wall with a combustion bowl formed in the top wall and having a combustion bowl edge, an outer ring belt formed with a plurality of ring grooves including a top ring groove with an upper wall of said top ring groove and a top land portion of said ring belt disposed between said top ring groove and said top wall, a pair of pin bosses with aligned pin bores and a skirt; and
a diamond dispersed chromium composite coating applied to at least said top wall, said combustion bowl edge, said top land portion, said pin bores and said upper wall of said top ring groove.

2. The assembly of claim 1 wherein said a diamond dispersed chromium composite coating is further applied to said skirt.

3. The assembly of claim 2 wherein said pin bosses include radially inner surfaces facing one another in spaced relation to one another and said diamond dispersed chromium composite coating being further applied to said radially inner surfaces of said pin bosses.

4. The assembly of claim 1 including a piston ring disposed in said top ring groove having an upper surface thereof that is free of said diamond dispersed chromium composite coating.

5. The assembly of claim 4 wherein said piston ring includes a radially outer surface that is coated with said diamond dispersed chromium composite coating.

6. The assembly of claim 1 including a wrist pin disposed in said pin bores and having an outer surface in operational contact with said pin bores that is free of said diamond dispersed chromium composite coating.

7. The assembly of claim 6 including a connecting rod having a small end bore at one of said connecting rod in which said wrist pin is received for coupling said piston body to said connecting rod, said small end bore being coated with said diamond dispersed chromium composite coating.

8. The assembly of claim 7 wherein said wrist pin includes a portion of said outer surface in operational contact with said small end bore of said connecting rod that is free of said diamond dispersed chromium composite coating.

9. The assembly of claim 8 wherein said piston body, said wrist pin and said connecting rod define a piston joint that is free of bearings or bushings.

10. The assembly of claim 1 wherein said top ring groove includes a bottom wall and a back wall and wherein all walls of said top ring groove are coated with said diamond dispersed chromium composite coating.

11. A power cylinder assembly comprising:
a piston having a top surface, at least one ring groove with groove wall surfaces and at least one pin bore with a pin bore surface;
at least one piston ring with an outer diameter surface, an inner diameter surface and top and bottom surfaces;
a connecting rod having one end with a small bore opening and an opposite end with a large bore opening;
a wrist pin having an outer surface;
a cylinder liner having an inner cylinder wall; and
a diamond dispersed chromium composite coating applied to at least a portion of said top surface of said piston, one of either a top wall surface of said at least one ring groove or said top surface of said piston ring, one of either said outer diameter surface of said piston ring or said inner cylinder wall of said cylinder liner, one of either of said outer surface of said wrist pin or said surfaces of said pin bore of said piston and said small bore opening of said connecting rod to define coated and noncoated surfaces.

12. The assembly of claim 11 wherein said piston includes a piston skirt having outer surfaces coated by said diamond dispersed chromium composite coating.

13. The assembly of claim 12 wherein the entire outer surface of said piston is coated with said diamond dispersed chromium composite coating.

14. The assembly of claim 11 wherein said noncoated coated surfaces in operational engagement with said coated surfaces have a hardness less than that of said coated surfaces.

15. The assembly of claim 14 wherein said noncoated surfaces have a hardness of about 20 Rc less than that of the coated surfaces.

16. The assembly of claim 11 wherein said diamond dispersed chromium composite coating is applied directly to the at least one pin bore surface such the piston is free of separate bearing inserts.

17. The assembly of claim 11 including a crank shaft having at least one crank arm surface for coupling with the large bore surface of said connecting rod and at least one journal disposed about a rotation axis of said crank shaft and an engine block having at least one crank support surface for supporting said at least one journal of said crankshaft for rotation, and wherein said diamond dispersed chromium composite coating is applied to one of said large bore surface of said connecting rod or said crank arm surface of said at least one crank arm, and to one of said at least one journal of said crank shaft or said at least one crank support surface of said engine block.

18. The assembly of claim 17 wherein said diamond dispersed chromium composite coating is applied directly to the engine block material of said crank support surface.

19. The assembly of claim 18 wherein said assembly is free of separate insert plain bearings in any articulating joints of the assembly.

20. The assembly of claim 18 wherein said at least one crank support surface includes a journal bearing having a metal backing and a layer of bearing material applied to the backing for journaling said crankshaft.

21. The assembly of claim 20 wherein said layer of bearing material comprises said diamond dispersed chromium composite coating.

22. The assembly of claim 11 wherein said piston includes a pair of pin bosses having an associated pair of said pin bores.

23. The assembly of claim 22 wherein said pin bosses have inner face surfaces facing toward one another and said connecting rod has a pair of outward face surfaces facing away from one another, and wherein said diamond dispersed chromium composite coating is applied to one of said pair of inward facing surfaces of said pin bosses or said pair of outward facing surfaces of said connecting rod.

* * * * *